United States Patent [19]

Haraguchi et al.

[11] Patent Number: 5,286,553
[45] Date of Patent: Feb. 15, 1994

[54] COMPOSITE SHEET FOR FIBROUS REINFORCING MATERIAL

[75] Inventors: Keiichi Haraguchi, Kusatsu; Fumigo Goto, Nobeoka, both of Japan

[73] Assignee: Asahi Kasei Kogyo Kabushiki Kaisha, Osaka, Japan

[21] Appl. No.: 728,026

[22] Filed: Jul. 8, 1991

Related U.S. Application Data

[63] Continuation of Ser. No. 465,185, Apr. 5, 1990, abandoned.

[30] Foreign Application Priority Data

Dec. 15, 1988 [JP] Japan .................................. 63-315091
Apr. 6, 1989 [JP] Japan ..................................... 1-85756

[51] Int. Cl.$^5$ ................................................ B32B 5/02
[52] U.S. Cl. ..................................... 428/233; 428/152; 428/284; 428/294; 428/299
[58] Field of Search ............... 428/288, 294, 297, 298, 428/299, 233, 232, 284, 152

[56] References Cited

U.S. PATENT DOCUMENTS

| | | | |
|---|---|---|---|
| 4,144,370 | 3/1979 | Boulton | 428/299 |
| 4,145,468 | 3/1979 | Mizoguchi et al. | 428/299 |
| 4,146,663 | 3/1979 | Ikeda et al. | 428/299 |
| 4,476,186 | 10/1984 | Kato et al. | 428/299 |
| 4,519,804 | 5/1985 | Kato et al. | 428/299 |

*Primary Examiner*—James J. Bell
*Attorney, Agent, or Firm*—Finnegan, Henderson, Farabow, Garrett and Dunner

[57] ABSTRACT

Disclosed is a composite sheet for a reinforcing material, which comprises a web comprised of a reinforcing filament bundle and a thermoplastic polymer fiber in the form of single filaments, and this composite sheet is characterized in that the thermoplastic polymer fiber is involved in the web-constituting filaments in an entangled and integrated state. This composite sheet is prepared by a process comprising depositing and incorporating the thermoplastic polymer fiber in the form of single filaments in the web comprising the reinforcing filament bundle, and applying a jet stream of a fluid to the assembly.

5 Claims, 1 Drawing Sheet

COMPOSITE SHEET FOR FIBROUS REINFORCING MATERIAL

This application is a continuation of application Ser. No. 07,465,185 filed Apr. 5, 1990 which is a continuation of International Application Ser. No. PCT/JP89/01265 filed Dec. 15, 1989.

DESCRIPTION

1. Technical Field

The present invention relates to a composite sheet for a fibrous reinforcing material. More particularly, it relates to a composite sheet comprising a web comprised of a reinforcing filament bundle and a thermoplastic polymer fiber in an entangled and mixed state suitable for a fibrous reinforcing material and having excellent moldability and processability.

2. Background Art

The use of fibrous reinforcing materials formed by bonding reinforcing fibers with various matrix resins is expected in various fields, due to their excellent properties such as a high strength, high rigidity, low specific gravity, and high fatigue resistance, and these materials have recently attracted attention as industrially valuable materials.

In general, when a fibrous reinforcing material is prepared by bonding a reinforcing fiber with a matrix resin, usually a thermosetting resin having an excellent flowability in the uncured state is used because the resin is easily dispersed uniformly in the fiber, is soft and has an excellent shapeability.

Nevertheless, to cure this thermosetting resin, it is generally necessary to conduct curing at a high temperature under a high pressure for a long time (usually, more than 1 hour), and thus, the productivity thereof is low and the general development of the fibrous reinforcing material is limited.

Attempts have been made to use a thermoplastic polymer instead of the thermosetting resin (see, for example, Japanese Unexamined Patent Publication No. 58-29651). Thermoplastic polymers used for the fibrous reinforcing material have a high rigidity at room temperature, and therefore, a method in which the fiber is merely impregnated with a polymer solution and the solvent is then removed, and a method in which a sheet-shaped film is heat-melted and forced to intrude under pressure among the fibers, are adopted.

The prepreg obtained according to the above-mentioned method is rigid at room temperature and has a poor shapeability; if the prepreg is forcibly bent the fiber is broken and thus the use of this prepreg is limited.

Therefore, development of a prepreg of a reinforcing fiber bundle bonded with a thermoplastic polymer having an excellent shapeability as a matrix has been made for several years. For example, the technique of forming a thermoplastic polymer into a fiber and mixing this fiber with a reinforcing fiber is disclosed in Japanese Unexamined Patent Publication No. 60-56545 and Japanese Unexamined Patent Publication No. 60-209033.

According to the method of Japanese Unexamined Patent Publication No. 60-56545, a bundle of a thermoplastic polymer fiber (abbreviated to "TP fiber" hereinafter) is merely combined with a bundle of reinforcing filaments, and both fibers are not uniformly mixed together. In the obtained mixture, the breaking of single filaments of the reinforcing filament bundle is controlled and the handling property at the post processing steps is excellent. Nevertheless, the mixture has a problem in that, at the hot-melting molding step, the reinforcing filament bundle is not substantially uniformly impregnated with the polymer.

Japanese Unexamined Patent Publication No. 60-209033 discloses an attempt to facilitate the impregnation by mixing single filaments of both fibers, but a product obtained by mixing filament bundles (continuous filament bundles) at single filament levels is in the state of a yarn, and to obtain a molded article able to be practically used, it is necessary to conduct the steps of forming the yarn into a sheet cutting the sheet in a desired fiber direction at a desired angle, laminating a plurality of cut sheets, and melting, cooling and solidifying the laminate. Especially to impart such a handling property such that the laminating operation becomes possible, at the step of forming the yarn into a sheet, a method is adopted in which the yarn is formed into a woven or knitted fabric. Since, however, many yarns are arranged in a narrow space and repeatedly passed through the mechanical reciprocating motion at the woven fabric forming step, fluffs are readily formed. Furthermore, even if the yarn is formed into a woven fabric, the force retaining the reinforcing filament bundle in the form of a woven fabric is a frictional force between one bundle of the reinforcing filaments and the reinforcing filament bundle crossing that bundle orthogonally, and this frictional force does not act on the cut end face, and thus a straying of yarns inevitably occurs. Since the reinforcing filament bundle is usually in the untwisted state, to increase the strength, the reinforcing filament bundle wherein straying of yarns occurs fails to exert a force uniting same in one bundle. Namely, the bundle is separated into floating fibers by only a slight force, and these single filaments adhere to the human body or the like. Accordingly, this method involves various operational problems.

Moreover, as described hereinafter, a reinforcing filament bundle is generally manufactured in the form of a thick bundle, compared with fibers for an apparel use, and since the reinforcing filament bundle is required to show a high strength and rigidity when embedded in a composite, the reinforcing filament bundle is woven in the untwisted state at a weave density lower than 15 yarns/cm, preferably lower than 8 yarns/cm, whereby the number of bends of the yarns is reduced. Accordingly, when the woven fabric is cut into a simple polygonal shape resembling a circle, the woven fabric can be relatively easily handled as a sheet, but when the woven fabric is cut into a complicated shape, for example, a zigzag cut, the woven fabric disintegrates and the handling thereof becomes very difficult.

A method in which a plain weave sheet is made by using a warp formed by paralleling reinforcing filaments together with thermoplastic polymer filaments, and using a weft composed of thermoplastic polymer filaments alone (Japanese Unexamined Patent Publication No. 60-28543), and a method in which a knitted fabric is made by knitting a reinforcing filament bundle and a thermoplastic polymer fiber in the state where the reinforcing filament bundle is enfolded in the thermoplastic polymer fiber (Japanese Unexamined Patent Publication No. 60-45362) have been proposed, but in this plain weave fabric or knitted fabric, the thermoplastic polymer fibers and reinforcing filaments are not uniformly mixed with each other, and the obtained composite has a low mechanical strength, especially tensile strength in the direction orthogonal to the reinforcing filament bundle.

A sheet product obtained by mixing reinforcing staple fibers with thermoplastic polymer staple fibers and forming the mixture into a sheet has been proposed (Japanese Examined Patent Publication No. 62-1969). In this sheet product, the reinforcing fiber used is a staple fiber arranged randomly to the fiber direction. Therefore, the frequency of crossing of the reinforcing fibers is much higher than in a sheet composed of reinforcing filaments, and a large space is necessary for crossing portions, and thus, the amount of the reinforcing fiber that is filled is limited. Moreover, since the staple fiber is used, the reinforcing effect is naturally low. Accordingly, the use of this sheet product is strictly limited in fields where high performances are required.

In the above-mentioned sheet product, the fibers are mixed but are not entangled and integrated, and thus, when the sheet product is dried, the reinforcing fiber is very easily separated and adhered to an operator during the handling thereof. Moreover, even if a bonding by heat fusion bonding or by using an adhesive is attempted, control of the softness is difficult, and if the bonding is excessive, the softness is lost. Still further, the sheet product has a very low bulk density after drying, and a long stroke length must be maintained when the sheet product is inserted into a press mold, or upon autoclave molding, the bagging film is wrinkled and left on the surface of the molded body. Therefore, this sheet product is not widely utilized.

As seen from the foregoing description, a mixed sheet of reinforcing filaments and TP fibers in which both fibers are sufficiently mixed, entangled and integrated with each other has not been provided, and the development of such a sheet is urgently required.

DISCLOSURE OF THE INVENTION

An object of the present invention is to satisfy this requirement and provide a composite sheet for a fibrous reinforcing material, which comprises fibers sufficiently and uniformly mixed, entangled and integrated with each other, and which has an excellent shapability and processability.

More specifically, in accordance with the present invention, there is provided a composite sheet for a fibrous reinforcing material, which comprises a web comprised of a bundle of reinforcing filaments and a thermoplastic polymer fiber in the form of single filaments, wherein the amount of the reinforcing filament bundle is 5 to 80% by volume based on the composite sheet and the single filaments of the thermoplastic polymer fiber are involved in the web-constituting filaments in an entangled and integrated state.

The above-mentioned composite sheet for a fibrous reinforcing material is prepared by a process which comprises depositing or incorporating a thermoplastic polymer fiber in the form of single filaments on or in a web comprising a bundle of a reinforcing filaments, and applying a jet stream of a fluid to the assembly to force the thermoplastic polymer fiber to intrude among the web-constituting filaments and entangle and integrate the thermoplastic polymer fiber with the web-constituting filaments.

BEST MODE FOR CARRYING OUT THE INVENTION

A bundle of reinforcing filaments is used in the present invention. In general, a reinforcing fiber has a high strength per unit area but the rigidity is high and the elongation is lower than 15%. Accordingly, the reinforcing fiber is very weak in the form of a single filament, and therefore, the reinforcing fiber is manufactured in the state of a bundle and a plurality of such bundles are gathered in parallel, woven or knitted to form a sheet, which is then used. The present invention is applied to this sheet-shaped reinforcing filament web.

By the term "web" used herein is meant a plane fiber assembly, regardless of whether or not it has a shape-retaining force. By the term "sheet" is meant a plane fiber assembly having a shape-retaining force. Especially, a sheet having a width/thickness ratio of at least 2, preferably at least 6, is meant in the present invention.

In the present invention, a web in which bundles of reinforcing filaments are gathered and unidirectionally paralleled, a woven sheet such as a plain weave or satin weave sheet, and a knitted sheet are used as the web. A woven sheet having a weave density lower than 15 yarns/cm, especially lower than 8 yarns/cm, and a web having bundles of reinforcing filaments gathered and unidirectionally paralleled (abbreviated to "UD web" hereinafter) are preferably used, because strength and rigidity can be effectively imparted in the necessary direction in the molded article. A UD web is especially preferably used. Preferably the respective filaments are gathered and unidirectionally paralleled in each of the web-constituting reinforcing filament bundles and the filaments are not entangled with one another. The presence or absence of entanglements can be easily observed if only the thermoplastic polymer fiber is extracted and removed from the composite sheet by a solvent.

It is considered that the reason why the UD web is superior to the woven sheet is probably as follows.

In the woven sheet, yarns bend at crossing points of warps and wefts, and since reinforcing filament bundles are tightened by these bends, when the woven sheet is formed into a composite, reinforcing filaments are not uniformly dispersed in the composite and concentration of the stress occurs, and thus, the mechanical properties become poor. Moreover, since the boundary between the warps and wefts is definite, when the woven sheet is formed into a composite, thermoplastic polymer-rich portions extending in the direction of the reinforcing filaments are formed, and the strength is low in the direction orthogonal to the reinforcing filaments in the composite.

By the term "reinforcing filament" herein used is meant a substantially continuous fiber used for a fibrous reinforcing material. For example, there can be mentioned a carbon fiber, a glass fiber, an aramid fiber, a silicon carbide fiber, a boron fiber, a metal fiber, a polybenzothiazole fiber, a polybenzoxazole fiber and an alumina fiber.

The reinforcing filament includes not only a multifilament but also a fiber yarn which is substantially continuous, although constituent single fibers per se are not continuous, such as a spun yarn. An untwisted continuous filament is especially preferably used because the strength and elastic modulus are increased when the fiber is formed into a composite material.

In the present invention, even a thermoplastic polymer filament can be used as the reinforcing filament if the fiber is not substantially melted at the step of heat-melting the thermoplastic polymer fiber and exerts a reinforcing function after cooling and solidification. For example, there can be mentioned a liquid crystal-type thermoplastic polymer filament, an ultra-high-molecular-weight polyethylene fiber, a polyvinyl alcohol fiber, a rayon fiber and other cellulose fiber. Among reinforcing filaments, a fiber having an elastic modulus of at least 3,000 kg/mm$^2$, especially at least 5,000 kg/mm$^2$, and a tensile strength of at least 100 kg/mm$^2$ is preferably used. As such a reinforcing long fiber, there can be mentioned a carbon fiber and an aramid fiber.

To facilitate the impregnation with a melt of the thermoplastic polymer fiber at the heat-melting step for forming a composite, preferably the surfaces of single filaments of the reinforcing filament bundle are coated with a thermoplastic polymer so that the softness is not lost.

The web containing the reinforcing filament bundle, referred to in the present invention, includes a web composed solely of the reinforcing filament bundle and a web comprising the reinforcing filament bundle and a thermoplastic polymer fiber and/or a thermoplastic polymer particle. The operation of incorporating the thermoplastic polymer fiber or particle into the web of the reinforcing filament bundle can be carried out either before or after the formation of a composite sheet, but in the case of the thermoplastic polymer fiber, this operation is carried out before the formation of a composite sheet and in the case of the thermoplastic polymer particle, the operation is carried out after the formation of a composite sheet. The fibrous or particulate thermoplastic polymer that can be incorporated into the web may be different from the filamentary thermoplastic polymer, if adverse influences are not imposed on the material properties after the melting, impregnation and cooling, but preferably the fibrous or particulate thermoplastic polymer is of the same kind as that of the filamentary thermoplastic polymer.

The amount of the reinforcing filament bundle in the composite sheet is 5 to 80% by volume, preferably 30 to 80% by volume, more preferably 45 to 70% by volume, based on the composite sheet. If the amount of the reinforcing filament bundle is smaller than 5% by volume, the strength and other physical properties are poor, and if the amount of the reinforcing filament bundle is larger than 80% by weight, the void ratio is increased and the strength and other physical properties are lowered.

By the term "thermoplastic polymer fiber" (TP fiber) used in the present invention is meant a fiber formed by spinning a thermoplastic polymer by using heat or a solvent according to conventional means, and the form of the fiber is not particularly critical and the fiber includes not only a fiber in the narrow sense but also a ribbon-shaped product. By the "thermoplastic polymer" is meant a polymer which flows at a temperature lower than the decomposition temperature of the polymer. As the thermoplastic polymer, there can be mentioned, for example, polyolefins, thermoplastic polyesters, thermoplastic polyamides, acrylic resins, polyoxymethylene, polycarbonate, polyphenylene ether, polystyrenes, polyphenylene sulfides, polyether ether ketones, polyether ketones, polyether imides, polyether sulfones, thermoplastic polyamide-imides, fluoro-resins, and copolymers thereof. The thermoplastic polymer may be in the form of an alloy, and two or more thermoplastic polymer fibers can be used, as long as the physical properties of the composite sheet are not lowered.

The term "single filamentary form" used in the present invention does not mean a filament constituting a fabric in which fibers are woven or knitted, but means, for example, a nonwoven fabric-like state wherein staple fibers are randomly arranged in one direction or a plurality of directions and single filaments have a freedom, and a nonwoven fabric-like state where filaments are arranged in the form of swirls to ensure a freedom.

In the present invention, by incorporating the thermoplastic polymer fiber in the form of single filaments having a large degree of freedom, the fibers can be very easily mixed, and a composite sheet in which fibers are entangled at many more points than in a woven fabric or knitted fabric can be obtained. This composite is not disintegrated into pieces even if finely cut, the shape-retaining property is very high, and the composite sheet has an excellent operation adaptability.

The amount of the single filamentary thermoplastic polymer fiber incorporated is not particularly critical. When a TP film or thermosetting resin is used in combination with the thermoplastic polymer fiber or the surface of the reinforcing filament is coated for improving the coloring property, adhesiveness, oxidation resistance, smoothness and impregnation easiness, the amount of the thermoplastic polymer fiber incorporated can be changed over a broad range. Nevertheless, the amount of the thermoplastic polymer fiber incorporated is generally at least 0.1% by volume, preferably at least 1% by volume, based on the composite sheet. If the amount is smaller than 0.1% by volume, the composite sheet has no shape-retaining property. To obtain a fibrous reinforcing material having a high strength and a high elastic modulus with a void ratio not larger than 5%, preferably the thermoplastic polymer fiber is incorporated in an amount of 20 to 95% by volume, and to maintain a higher strength and a higher modulus of elasticity with a void ratio not larger than 1%, preferably the thermoplastic polymer fiber is incorporated in an amount of 30 to 70% by volume, especially 30 to 55% by volume.

It is sufficient if the diameter of the section of the TP fiber is not much larger than the diameter of the section of the reinforcing fiber, and the TP fiber has a thickness such that it imparts a softness and allows a free bending. The diameter of the section of the TP fiber is preferably less than 10 times the diameter of the section of the reinforcing fiber, and most preferably, less than 5 times the diameter of the section of the reinforcing filament. To adjust the mixing property and shape-retaining property, at least two kinds of TP fibers having different thicknesses can be used.

By the term "degree of freedom of the TP filament" used in the instant specification is meant a latitude such that the fiber is allowed to intrude into the reinforcing filaments without being cut when the TP filament undergoes a mechanical process. More specifically, one point (point A) on one continuous single filament in the sheet-shaped product is noted, and two points at which this continuous single filament crosses a circle having a radius of 5 cm, with the point A being the center, are designated as points B. The length of the continuous single filament from one point B to the other point B is measured in the state wherein the filament is linearly elongated. the value obtained by dividing the measured length by 10 cm is defined as the degree of freedom.

In view of the mixing ease, preferably the freedom of the TP filament used in the present invention is at least 1.2, more preferably at least 1.5, most preferably at least 3.0.

The thermoplastic polymer staple fiber referred to in the present invention is a fiber having a length not longer than 100 cm, preferably not longer than 10 cm, and an L/D ratio (the value obtained by dividing the length L of the fiber by the diameter D of the fiber) not larger than 10,000,000, preferably not larger than 1,000,000. A fiber having a length not longer than 30 mm is especially preferable because the degree of freedom is high and the mixing and entanglement can be easily accomplished. Of course, even a fiber having a length exceeding the above range can be preferably used if a shape ensuring a large degree of freedom is obtained (for example, the fiber is creeped or the fiber is deposited in the form of swirls). The lower limit of the fiber length is such that the L/D is at least 5, preferably at least 50. In view of the entanglement ease and shape-retaining property, the L/D is most preferably at least 100. The absolute length is at least 10 times the diameter of the reinforcing fiber, and in view of the shape-retaining property, the absolute length is preferably at least 50 times the diameter of the reinforcing filament.

By the term "entanglement" is meant the state wherein the TP fiber intrudes into the reinforcing filament bundle and both fibers are sterically mixed, and preferably, most of the individual single filaments of the TP fiber are entangled with the reinforcing filament bundle while intruding into the reinforcing filament bundle. By the term "integrated" is meant the state wherein single filaments of the TP fiber are mutually entangled with one another and with the reinforcing filaments and the entire filaments are bound so that they cannot be separated under their own weight. To obtain this integration, preferably the TP fiber is arranged at least in a direction different from the direction of arrangement of the reinforcing filaments. More specifically, when the entire sheet is handled, a doughnut-shaped sample having an inner diameter of 10 cm and an outer diameter of 11 cm is cut out, and if this doughnut-like shape can be retained when the sample is lifted by picking up the sample at two points by fingers, it is judged that the sheet is integrated.

If the sheet is thus integrated, even when the sheet is cut into a fine complicated shape, the sheet is not separated into pieces, and the laminating operation and the setting operation at a mold can be easily accomplished.

Furthermore, the following effect can be unexpectedly obtained. Namely, the TP fiber is not arranged in the direction of the reinforcing filaments, and it is estimated that after the melting, cooling and solidification, the TP molecules are three-dimensionally and randomly arranged. Accordingly, the strength is high in the direction orthogonal to the direction of the reinforcing filaments. Especially, if a fiber of a liquid crystal-type thermoplastic polymer, which shows a liquid crystal property in the molten state and shows a high anisotropic characteristic according to the orientation direction of the liquid crystal at the cooling and solidification, such as a wholly aromatic polyester resin, is used, a reinforcing material having an especially high strength in the orthogonal direction can be obtained.

Furthermore, if the rigid reinforcing filament are densely gathered and paralleled, the bulk density is increased and the insertion into a draw die is simplified, or filling in a press mold is easily accomplished and the change of the volume before and after the autoclave molding is reduced. Accordingly, wrinkling by shrinkage of the bagging film can be reduced. The bulk density of the composite sheet is preferably at least 0.1 g/cm$^3$, more preferably at least 0.3 g/cm$^3$.

In the composite sheet of the present invention, to improve the rigidity, flowability, coloring property, oxidation resistance, lubricating property, interlaminar bonding strength, and other performances, at least one member selected from the group consisting of inorganic fillers, organic fillers, whiskers, pigments and plasticizers can be incorporated according to need. Especially, to improve the strength and modulus of elasticity in the direction orthogonal to the reinforcing filament bundle, preferably a gas phase method carbon staple fiber, a potassium titanate whisker, a silicon carbide whisker or other whisker be incorporated in an amount of 0.1 to 20% by volume.

The process for the preparation of the composite sheet of the present invention will now be described.

The process for obtaining the composite sheet of the present invention is not particularly critical. But preferably, a process is adopted in which a thermoplastic polymer staple fiber or filament is deposited or incorporated in the form of single filaments on or in a web containing a reinforcing filament bundle, and a jet of a fluid is applied to the assembly to intrude the thermoplastic polymer fiber into the reinforcing filament bundle and entangle and integrate the thermoplastic polymer fiber with the filaments.

The thermoplastic polymer can be formed into a fiber by wet spinning, dry spinning or melt spinning, and an appropriate method is selected according to the kind of resin. According to a preferred embodiment, wherein staple fiber of a thermoplastic polymer is used, a spun fiber of a thermoplastic polymer is cut or drawn to form staple fibers, the staple fibers are dispersed in a liquid, and the dispersion is subjected to a paper-making operation to obtain a TP staple fiber web. Many reinforcing filament bundles are unidirectionally paralleled to form a web, and this web is laminated on the TP staple fiber web. According to a preferred embodiment wherein thermoplastic polymer filaments are used, a thermoplastic polymer is heated and melted, the melt is injected through spinning orifices which are forcibly oscillated in the direction orthogonal to the direction of the filaments of a web formed by unidirectionally paralleling many reinforcing filament bundles, to form a fiber, a stream of a gas is applied to the spinneret, the fiber is shaken off on the web of the reinforcing filament bundle while the fiber is drawn, and the fiber is laminated in the form of a sheet on the filament bundle web.

Then the laminate of the TP staple fiber or filament sheet and the reinforcing filament bundle is subjected to a mechanical process by a jet stream of a fluid. More specifically, at least two sheets of the TP fibers and at least two webs of the reinforcing filament bundles are laminated (lamination is sometimes carried out by changing the arranging direction of the reinforcing fiber or using different kinds of reinforcing fibers), and the jet stream of a fluid is made to pierce through the laminate in the direction orthogonal to the plane of the sheet, whereby the TP fiber is embedded in the reinforcing filament bundle web and is entangled and integrated with individual filaments of the reinforcing filament bundle to obtain the intended composite sheet.

This process of utilizing a jet stream of a fluid for the entanglement is advantageous because little breaking of the reinforcing filament occurs, rigid reinforcing filaments are not mingled with one another, and the bulk density of the mixed sheet is high.

The fluid jet stream used in this process is obtained by releasing a compressed fluid into the atmospheric pressure through a nozzle having a hole-shaped or slit-shaped orifice. The pressure of the fluid and the size of the orifice of the nozzle depend on the position and direction of the nozzle, but preferably the fluid pressure is 3 to 400 kg/cm² and the hole diameter of the nozzle is 0.05 to 2 mm.

The kind of the fluid used is not particularly critical, and a liquid, a liquid-mixed gas, a solid-mixed liquid or a solid-mixed gas can be used. A fluid having a high density can preferably be used to impart a large mixing action to the fibers. More specifically, preferably the density of the fluid is at least 0 1 g/cm³. In view of the availability and safety thereof, water is generally used. During the fluid jetting treatment, preferably the fluid which has lost kinetic energy is promptly removed by vacuum suction or the like.

Note, the object of the present invention can be obtained by using a woven sheet or knitted sheet instead of the web comprising reinforcing filament bundles unidirectionally paralleled.

According to another embodiment using a thermoplastic polymer (TP) fiber, a TP short fiber is incorporated in the reinforcing filament bundle in advance, and the above-mentioned fluid jet stream is applied to the obtained web to entangle and integrate the TP short fiber with the reinforcing filament bundle.

The mixing property of the composite can be improved without degradation of the softness by impregnating the composite sheet with a thermoplastic polymer emulsion and drying the sheet at a temperature lower than the lowest film-forming temperature, or by spraying polymer particles onto the composite sheet and incorporating the polymer particles into the composite sheet. Furthermore, a process can be adopted in which, after mixing by the mechanical action by the fluid jet stream, the composite sheet is heated at a temperature higher than the temperature at which a thermal distortion of the TP fiber occurs but lower than the temperature at which a fusion bonding of the TP fiber occurs, and the sheet is compressed to an extent such that no breaking of the reinforcing filament occurs, to increase the bulk density, whereby an integrated sheet can be obtained.

The present invention will now be described in detail with reference to the following examples that by no means limit the scope of the invention.

EXAMPLE 1

A nylon 66 polymer (Leona Polymer supplied by Asahi Kasei Kogyo) was melt-spun to obtain a 770 denier/770 filament bundle. To ensure an easy opening property, the filament bundle was wound so that the bundle was not twisted, and water-soluble PVA (polyvinyl alcohol) was applied as a sizing agent to the filament bundle. Many filament bundles thus prepared were gathered and cut to a size of 5 mm by a guillotine cutter, to obtain a TP staple fiber.

When this TP staple fiber was observed by a microscope it was found that the fiber had a columnar shape having a diameter of 11 μm and an L/D ratio of 455.

Then this staple fiber was dispersed in water and polyacrylamide was added to obtain a slurry having a viscosity of 100 cp. The slurry was uniformly injected onto a bottom portion of a water tank having a rectangular shape having a width of 50 cm and a length of 100 cm and having a 200-mesh metal net spread at the bottom to obtain a sheet having a basis weight of 64 g/m².

When the directions of the thermoplastic polymer staple fiber in the formed sheet were observed, it was found that the thermoplastic staple fiber was arranged substantially completely randomly.

Then 375 reinforcing carbon filament bundles (High Carboron 6 KF Yarn supplied by Shin Asahi Kasei Carbon Fiber) each made from a PAN fiber, composed of 6,000 single filaments, and having a 3,600 denier, a tensile strength of 400 kg/mm², a tensile modulus of elasticity of 23 ton/mm², and a diameter of 7 μm were gathered and paralleled without space to form a sheet having a width of 50 cm and a basis weight of 300 g/m². This sheet was placed on the above-mentioned TP staple fiber sheet, then a TP staple fiber sheet having a basis weight of 64 g/m² was prepared on the laminate in the above-mentioned TP staple fiber sheet-forming manner. While the obtained sandwich sheet was placed on the 200-mesh metal net, water was applied under a pressure of 10 kg/cm² over the entire surface of the sheet, vertically thereto, from 500 nozzles having an orifice diameter of 0.2 mm, which were arranged linearly at intervals of 1 mm with the distance between the nozzles and sheet being adjusted to 30 mm. This operation was conducted once from the front side and once from the back side. Then water was applied under a pressure of 40 kg/cm² three times from the front side and three times from the back side, and the sheet was then dried to obtain a composite sheet. In this composite sheet, the TP fiber was embedded among individual filaments of the reinforcing filament bundle, the TP fiber was entangled with each other and with the reinforcing filament, and the composite sheet had an entangled and integrated structure. Even if the end portion of the sheet was picked up by the thumb and forefinger, the sheet having a size of 50 cm × 100 cm did not separate into pieces, and the sheet was entangled and had a rich softness. When a doughnut-shaped sample having an outer diameter of 11 cm, an inner diameter of 10 cm, and a width of 5 mm was cut from the composite sheet, and the sample was lifted by picking up the composite sheet at one point by the fingers, the sample did not separate into pieces and fibers did not come loose from the end portion, and it was found that the sheet had an excellent handling property such that it could be handled as if it were a sheet of paper.

A tape having a width of 2.5 cm and a length of 15 cm was cut from the composite sheet in the direction orthogonal to the reinforcing filament, and when the tensile strength was measured, it was found to be 3,310 g/cm².

A square sample having a side of 10 cm was cut from the composite sheet and placed on a flat plane. An iron plate having a thickness of 3 mm was placed on the sample and the thickness of the sample was measured, and the weight of the sheet was measured. When the bulk density was determined based on the measured values, it was found to be 0.36 g/cm³.

The composite sheet was treated with concentrated sulfuric acid and only the nylon polymer was gently dissolved out and extracted to obtain a sheet composed solely of the carbon fiber, and an attempt was made to measure the strength in the direction orthogonal to the carbon fiber. When an attempt was made to lift up the cut out tape, however, the tape separated into pieces and the tensile strength was lower than 1 g/cm$^2$.

A square sheet having a side of 10 cm was cut from the above-mentioned composite sheet, and one layer of the sheet was piled thereon in the direction of 0°, two layers were piled in the direction of 90°, and one layer was further piled in the direction of 0°. The assembly was wound in the form of a semi-cylinder having a diameter of 7 cm and covered with a Teflon film. The periphery was sealed with a Teflon rubber and the assembly was set in an autoclave while producing vacuum within the film. The assembly was treated at 300° C. under 20 kg/cm$^2$ for 30 minutes, cooled and solidified, and taken out from the autoclave. When the film was removed, a molded body having a semi-cylindrical shape was obtained. When a part of the molded body was take out and the density was measured, it was found that the density was the same as the theoretical density and the void ratio was lower than 0.1%. When the section was observed by an optical microscope of 200 magnifications, no voids were found.

EXAMPLE 2

The nylon 66 filament bundle obtained in Example 1 was inserted into a Y-shaped pipe from an upper opening, and water was poured from another opening, whereby filaments were sucked into the water stream and caused to flow downward, and the filaments were extruded from the lower end of the pipe. The pipe was oscillated 30 times per minute at an amplitude of 2 cm, and the filament bundle was shaken down uniformly in a bottom portion of a rectangular shaped water tank having a width of 50 cm and a length of 100 cm and having a 200-mesh net spread at the bottom, to prepare a sheet having a basis weight of 64 g/m$^2$.

One single filament was carefully sampled from the formed sheet, and when the degree of freedom of the single filament was measured, it was found to be 4.7.

The carbon fiber sheet obtained from a PAN fiber in Example 1 was placed on this sheet, and the nylon 66 filament sheet was similarly prepared on the sheet, to form a sandwich sheet. The obtained sandwich sheet was treated and dried in the same manner as described in Example 1 to obtain a composite sheet. In this composite sheet, the TP fiber was intruded among individual filaments of the reinforcing filament bundle, and the composite sheet had a structure in which the TP fiber was entangled and integrated with each other and with the reinforcing filaments. Even if the end portion of the sheet was picked up by the forefinger and thumb, the sheet having a size of 50 cm × 100 cm did not separate into pieces but retained the integral structure and had a rich softness.

When the tensile strength of the composite sheet was measured in the same manner as described in Example 1, it was found to be 1,930 g/cm$^2$. A square sample having a side of 10 cm was cut the composite sheet and placed on a flat plane, and an iron sheet having a thickness of 3 mm was placed on the sample to measure the thickness. Furthermore, the weight of the sheet was measured. The bulk density was determined from the measured values, and was found to be 0.38 g/cm$^3$.

COMPARATIVE EXAMPLE 1

A sheet was prepared by repeating the procedures of Example 2 in the same manner except that the pipe was not oscillated, although the pipe was oscillated 30 times per minute in Example 2, and while the shake-down direction was adjusted to about 90° to the direction of the reinforcing filament, the filament bundle was randomly shaken down.

When the degree of freedom of the single filament in the obtained sheet was measured in the same manner as in Example 2, it was found that the degree of freedom of the single filament was 1.1.

A composite sheet was prepared from this sheet in the same manner as in Example 1. In the obtained sheet, the thermoplastic polymer filament was not entangled, and when the end portion of the sheet was picked up, the sheet separated into pieces and the handling was very bad.

EXAMPLE 3

A composite fiber was prepared in the same manner as described in Example 1 except that the basis weight of the TP staple fiber was changed to 42.5 g/m$^2$ and the unidirectional carbon fiber sheet was changed to a plain weave sheet having a basis weight of 198 g/m$^2$ and woven from High Carboron 3 Kf yarn composed of 3,000 single filaments at a weft density of 5 wefts per cm and a warp density of 5 warps per cm. When a doughnut-shaped sample having an outer diameter of 11 cm, an inner diameter of 10 cm and a width of 5 mm was cut from the composite sheet, the sample did not separate into pieces even if the sample was lifted by picking up one point of the sample by the fingers and the yarn did not come loose from the end portion. Namely, the sheet had an excellent handling property such that the sheet could be handled as if it were a sheet of paper. When the bulk density was measured, it was found to be 0.33 g/cm$^3$.

For comparison, when a doughnut-shaped sample was cut from the plain weave sheet of the carbon fiber used in this example in the same manner as described above, the yarn became loose from the end face and the sample sheet was very difficult to handle. When the sample sheet was lifted by picking it up by the fingers, the sheet separated into pieces and could not be handled unless particular care was taken.

EXAMPLE 4

Two kinds of staple fibers having lengths of 10 mm and 5 mm, respectively, were obtained in the same manner as described in Example 1, from a filament yarn (780 denier/390 filaments) of a polyether ether keton polymer (Victorex supplied by Imperial Chemical Industry) instead of the nylon 66 fiber prepared in Example 1. The staple fibers differing in size were charged into different vessels and were slurried. The carbon fiber used in Example 1 was continuously thrown into the slurry of the staple fiber while being opened, and the carbon fiber bundle in the slurry was stuck by a needle canvas having needles implanted at intervals of 4 mm, and the needles were separated from the carbon fiber bundle. This operation was repeated so that the carbon fiber was sufficiently opened even in the liquid, and then the carbon fiber was gently drawn up. A staple fiber-mixed reinforcing filament bundle was obtained in which the staple fiber was dispersed in the carbon fiber bundle in an amount of 36 g per 100 g of the carbon fiber, and this fiber bundle was gathered and paralleled in the same manner as described in Example 1 to obtain a sheet having a basis weight of 408 g/m$^2$. In this sheet, the staple fiber was not entangled, and when the sheet was lifted up by hand, the sheet separated into pieces.

The sheet was carefully carried in the state where the sheet was placed on piano wires spread in parallel at intervals of 4 mm, and separately, two sheets having a basis weight of 10 g/m² were formed by the paper-forming method by using the staple fiber having a length of 10 mm, and the above-mentioned sheet was interposed between the thus-formed sheets. This laminating operation was carried out through the piano wires and after the lamination, the piano wires were gently drawn out one by one. When the high-pressure water stream treatment was carried out in the same manner as described in Example 1, an entangled and integrated sheet was obtained which did not separate into pieces even when the sheet was lifted up by hand. When the composite sheet was cut and the section was observed, it was found that the reinforcing filament was mixed with the staple fiber more uniformly than in the sheet obtained in Example 1. The tensile strength of the composite sheet in the direction orthogonal to the reinforcing filament was 3,510 g/cm², and the bulk density was 0.38 g/cm³.

EXAMPLE 5

A sheet formed by gathering and paralleling the staple fiber-mixed reinforcing filament bundle used in Example 4 in one direction was treated so that the staple fiber was arranged in the direction orthogonal to the reinforcing filament. More specifically, a spit on which needles having a sharpened point and a diameter of 1 mm were implanted at intervals of 5 mm was vertically stuck into the sheet, the spit was moved by 3 mm in parallel to the reinforcing filament in the stuck state, and the spit then drawn out. This operation of arranging only the staple fiber in the orthogonal direction was carried out over the entire surface of the sheet. The sheet was subjected to the high-pressure water stream treatment and dried in the same manner as described in Example 1, and when the dried sheet was taken out and examined, it was found that the staple fiber was uniformly mixed, entangled and integrated. When the sheet was lifted up by both hands, the sheet did not separate into pieces, and it was confirmed that the sheet had an excellent handling property. The strength in the direction orthogonal to the reinforcing filament was 1,850 g/cm², and bulk density was 0.34 g/cm³.

COMPARATIVE EXAMPLE 2

The nylon 66 short fiber cut to 8 mm, as used in Example 1, was mixed with a carbon fiber cut in 8 mm in the same manner, so that the carbon fiber/nylon 66 fiber weight ratio was 7/3, and a sheet was formed by the paper-making method. The sheet was dried and the bulk density was measured in the same manner as described in Example 1, and it was found that the bulk density was 0.037 g/cm³ and the sheet was very bulky. When the sheet was picked by hand after drying, the sheet readily separated into pieces and the carbon fibers adhered to the hand, and the sheet was very difficult to handle.

EXAMPLE 6

Composite sheets differing in the incorporation ratio of the carbon fiber as shown in Table 1 were prepared in the same manner as described in Example 1, by adjusting the basis weight of the formed sheet of the staple fiber by controlling the amount of the TP staple fiber. A square sample having a side of 30 cm was cut from each of the obtained composite sheets, sample plates were prepared at 300° C. under 20 kg/cm² for 30 minutes by using matched dies having the same size, and the flexural strength was measured.

For comparison, plates were prepared in the same manner as described above by adjusting the amount of the TP fiber in Comparative Example 2, adjusting the length of the carbon fiber to 25 mm, and adjusting the incorporation ratio of the carbon fiber, and the flexural strength was measured. The results are shown in Table 1. In the case of the comparative composite sheet having a low bulk density, to obtain a thickness of 3 mm, the pack thickness exceeded 10 cm and the fibers could not be contained in a mold. Accordingly, in this case, a plate was prepared by conducting the operation two times or more.

TABLE 1

| Run No. | | 1* | 2 | 3 | 4 | 5 | 6 | 7 | 8* |
|---|---|---|---|---|---|---|---|---|---|
| Carbon fiber | % by volume | 4.0 | 10.0 | 30.0 | 40.0 | 50.0 | 70.0 | 57.0 | 85.0 |
| | % by weight | 6.1 | 14.5 | 40.1 | 51.1 | 61.0 | 78.5 | 82.4 | 89.9 |
| Nylon 66 | % by volume | 96.0 | 90.0 | 70.0 | 60.0 | 50.0 | 30.0 | 25.0 | 15.0 |
| fiber | % by weight | 93.9 | 85.5 | 59.9 | 48.9 | 31.0 | 21.5 | 17.6 | 10.1 |
| Present Invention | Void ratio (%) | 0 | 0 | 0 | 0 | 0 | 0 | 0.8 | 7.0 |
| | Flexural strength (kg/mm²) | 19.5 | 33.0 | 80.2 | 108.5 | 128.5 | 155.1 | 149.0 | 95.5 |
| | Flexural modulus of elasticity (t/mm²) | 1.2 | 2.3 | 6.6 | 8.7 | 10.6 | 14.1 | 15.0 | 11.5 |
| | Bulk density (g/cm³) | 0.14 | 0.16 | 0.18 | 0.19 | 0.30 | 0.37 | 0.40 | 0.41 |
| Comparative Example | Void ratio (%) | 0 | 0 | 2.9 | 5.6 | 10.0 | | | |
| | Flexural strength (kg/mm²) | 14.5 | 20.5 | 25.0 | 20.5 | 18.0 | | | |
| | Flexural modulus of elasticity (t/mm²) | 0.5 | 0.8 | 1.5 | 1.4 | 1.1 | | | |
| | Bulk density (g/cm³) | 0.029 | 0.030 | 0.030 | 0.032 | 0.035 | | | |

*Comparative Example

As apparent from Table 1, if the mixing ratio of the reinforcing fiber is lower than 5% by volume, the physical properties are not substantially different from those of the product of Comparative Example 2, but if the incorporation ratio of the reinforcing fiber is 5% by volume or higher, the physical properties are greatly different from those of the product of Comparative Example 2. Especially, if the incorporation ratio of the reinforcing fiber exceeds 30% by volume, in the comparative product, the void ratio is increased and the strength and other physical properties become very poor, and the difference between the product of the present invention and the comparative product becomes conspicuous. If the mixing ratio of the reinforcing fiber exceeds 80% by volume, however, the void ratio is increased and the strength and other physical properties are lowered.

EXAMPLE 7

Staple fibers having lengths of 15 mm and 2.5 mm, respectively, were prepared in the same manner as described in Example 1 by using a filament yarn (900 denier/300 filaments) of a polyether ether ketone (hereinafter abbreviated to "PEEK") instead of the nylon 66 fiber used in Example 1. The two kinds of the staple fibers were thrown at a weight ratio of 1/1 into water, and polyacrylamide was added to form a slurry having a viscosity of 100 cp. A PEEK staple fiber sheet having a basis weight of 73 g/m$^2$ was formed from the slurry by using an inclined paper-making machine having an 80-mesh metal net.

The same carbon filament sheet used in Example 1 was used and was fixed to a frame having a width of 50 cm and a length 60 cm to stretch the sheet for preventing expansion of the width. The above-mentioned PEEK staple fiber sheet was piled on the carbon fiber sheet. The laminate sheet was placed on an 80-mesh metal net and a high-pressure water stream continuously jetted under a pressure of 20 kg/cm$^2$ from 100 nozzles having an orifice diameter of 0.2 mm, which were linearly arranged at intervals of 5 mm, was vertically applied to the entire surface of the laminate sheet two times, and a high-pressure water was further applied under a pressure of 50 kg/cm$^2$ four times. Then the sheet was turned over and fixed to the frame to keep the carbon fiber under tension, the PEEK staple fiber sheet was piled, and the high-pressure water stream treatment was carried out in the same manner as described above, whereby a composite sheet having the carbon filament sheet having PEEK staple fiber sheets entangled and integrated on both surfaces was obtained.

The tensile strength of the composite sheet in the direction orthogonal to the reinforcing filament was 3,120 g/cm$^2$ and the bulk density was 0.34 g/cm$^3$. Even if the sheet was finely cut as in Example 1, the sheet showed an excellent operation adaptability and could be handled as if it were paper.

Figure 1:
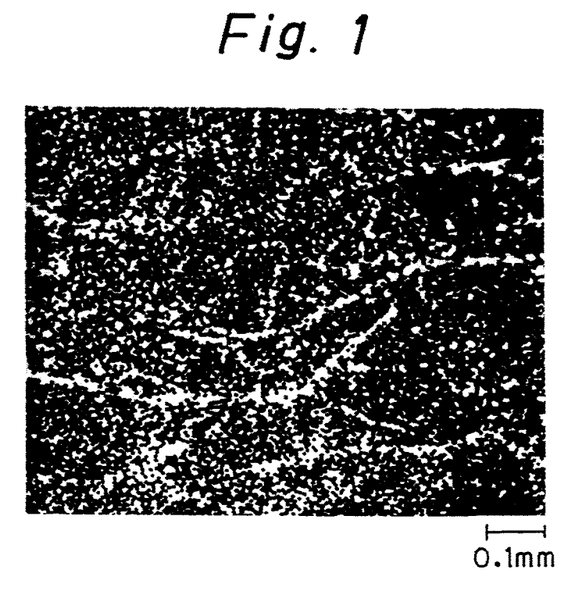
FIG. 1 is a sectional view of a composite made from the composite sheet of the present invention.

Seven composite sheets as prepared above were piled so that the directions of the reinforcing fibers were in agreement with one another, and by using the same mold as used in Example 6, the melt impregnation was carried out at 360° C. under 10 kg/cm$^2$ for 5 minutes and the cooling solidification was conducted to obtain a plate-shaped composite (C1). When the carbon fiber content in the plate was measured by using concentrated sulfuric acid, it was found to be 60% by volume. The plate was a uniform composite having a black color, and when the section of the plate was observed in the magnified state by a microscope, it was found that the carbon fiber was uniformly dispersed (see FIG. 1). The strength of the plate in the direction of 0° was 168.5 kg/mm$^2$, and the modulus of elasticity was 10.7 ton/mm2 in the direction of 0°. The strength and modulus of elasticity in the direction of 90° were 8.2 kg/mm$^2$ and 0.9 ton/mm$^2$, respectively.

For the production of another composite, eleven composite sheets prepared in the above-mentioned manner were piled so that the directions of the reinforcing fibers were in agreement with one another, and by using the mold used in Example 6, the melt impregnation was carried out at 420° C. under 100 kg/cm$^2$ for 10 minutes while preventing an intrusion of air, and the cooling solidification was conducted to obtain a plate-shaped composite C2. The carbon content in the plate was 60% by volume, and the plate was a uniform composite having a black color. When the section of the plate was observed in the magnified state by a microscope, it was found that the carbon fiber was uniformly dispersed and the section was seemingly the same as that of the composite (C1) (shown in FIG. 1). The strength and modulus of elasticity of the plate in the direction of 0° were 192 kg/mm$^2$ and 11.2 ton/mm$^2$, respectively, and in the direction of 90°, the strength and modulus of elasticity of the plate were 12.1 kg/mm$^2$ and 0.9 ton/mm$^2$, respectively.

COMPARATIVE EXAMPLE 3

A 4,500-denier yarn was made by doubling the carbon fiber bundle used in Example 1 with the PEEK fiber bundle used in Example 7. A plain weave sheet was made by using this doubled yarn as the warp at a warp density of 4 yarns per cm, and only the PEEK fiber bundle as the weft at a weft density of 3.8 yarns per cm.

In the above-mentioned plain weave sheet, the reinforcing filaments were unidirectionally paralleled. But, the yarn became loose from the end face and the sample sheet was very difficult to handle and readily deformed unless particular care was taken. When a doughnut-shaped sample having an outer diameter of 11 cm and an inner diameter of 10 cm was cut from the sheet and was lifted by picking it up by the fingers, the cut sheet separated into pieces and was very difficult to handle.

Figure 2:
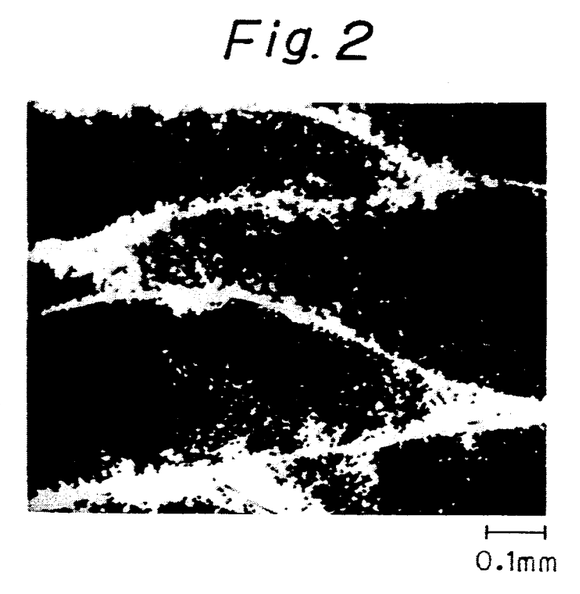
FIG. 2 is a sectional view of a composite made from the conventional composite sheet.

Thirteen sheets prepared in the above-mentioned manner were piled so that the directions of the reinforcing fibers were in agreement with one another, and by using the mold used in Example 6, the melt impregnation was carried out at 360° C. under 10 kg/cm$^2$ for 5 minutes and the cooling solidification was conducted to obtain a plate. When the carbon fiber content in the plate was measured by using concentrated sulfuric acid, it was found to be 60% by volume as in Example 7, but the appearance of the plate was clearly different from that of the product of Example 7. Although the plate (C1) of Example 7 was a uniform black composite, the polymer was not uniform in the plate of this comparative example and white stripes were found here and there. When the section of the plate was observed in the magnified state by a microscope, it was found that the carbon fiber was gathered here and there (see FIG. 2). The strength and modulus of elasticity of the plate in the direction of 0° were 102 kg/mm$^2$ and 8.7 ton/mm$^2$, respectively, and the strength and modulus of elasticity of the plate in the direction of 90° were 4.1 kg/mm$^2$ and 0.4 ton/mm$^2$, respectively. The plate had much inferior physical properties.

COMPARATIVE EXAMPLE 4

The carbon fiber bundle (3,600 denier/6,000 filaments) used in Example 1 and the PEEK polymer continuous fiber bundle (1,500 denier/500 filaments) used in Example 7 were immersed at the same speed into water, and were stirred by using confronting nozzles to mix the fibers. The mixture was taken up and dried to obtain a mixed fiber yarn. It was intended to obtain a unidirectional sheet by gathering and paralleling such yarns, but when the sheet was lifted up by hand, the sheet separated into pieces and could not be handled by a usual method. Accordingly, the sheet was sandwiched between thin PEEK fiber woven fabrics having a basis weight of 20 g/m$^2$ and sewn with a PEEK thread to form a sheet. When a doughnut-shaped sample cut from this sheet was lifted up, the sheet separated into pieces.

Sixteen composite sheets prepared in the above-mentioned manner were piled so that the directions of the reinforcing fibers were in agreement with one another. By using the mold used in Example 6, the melt impregnation was carried out at 420° C. under 100 kg/cm² for 10 minutes while preventing an intrusion of air, and the cooling solidification was conducted to obtain a plate-shaped composite. The carbon content in the plate was 60% by volume, and the plate was a uniform black composite. When the section of the plate was observed in the magnified state by a microscope, it was found that the black fiber was uniformly dispersed, and the composite was seemingly the same as the composites (C1 and C2) of Example 7. The strength and modulus of elasticity in the direction of 0° were 193 kg/mm² and 11.7 ton/mm², respectively, and were not substantially different from those of the composite C2 of Example 7, but in the direction of 90°, the strength and modulus of elasticity were 9.2 kg/mm² and 0.8 ton/mm², respectively, and the physical properties were poor.

EXAMPLE 8

The high-pressure water stream treatment was carried out in the same manner as described in Example 7 except that a filament yarn (200 denier/72 filaments) of a polyphenylene sulfide polymer was used instead of the PEEK fiber used in Example 7, whereby a composite sheet comprising a carbon filament sheet having PPS staple fibers entangled and integrated on both surfaces, which could be easily handled, was obtained. The tensile strength in the direction orthogonal to the carbon fiber was 3,350 g/cm² and the bulk density was 0.34 g/cm².

EXAMPLE 9

According to the example of Japanese Unexamined Patent Publication No. 54-77691, p-acetoxybenzoic acid and 6-acetoxy-2-naphthoic acid (molar ratio=75/25) were subjected to the acetic acid-removing melt polymerization to obtain a high polymer showing an optical anisotropy in the heat-melted state.

This polymer was extruded from a spinneret having 56 orifices having a diameter of 0.1 mm at 320° C., and the extrudate was air-cooled and wound to obtain a filament bundle having a single filament denier of 3. In the same manner as described in Example 1, the filament bundle was cut into staple fibers having lengths of 20 mm and 5 mm. Both staple fibers were mixed at a weight ratio of 1/1 and dispersed in water, and a sheet was made by the paper-making method. Then the sheet was piled on carbon filaments unidirectionally paralleled, and the laminate was subjected to a high-pressure water stream treatment to obtain a composite which could be easily handled. The tensile strength in the direction orthogonal to the carbon fiber was 3,250 g/cm², and the bulk density was 0.34 g/cm³.

EXAMPLE 10

A glass flask having an inner volume of 500 ml was charged with 50 g (0.23 mole) of 4,4-difluorobenzophenone, 69 g (0.5 mole) of finely divided potassium carbonate and 50 g of benzophenone as a solvent, and the inner atmosphere of the flask was replaced by nitrogen. The temperature was elevated to 300° C. over a period of 1 hour, while stirring, and a reaction was carried out while maintaining this state.

The obtained reaction product was pulverized and washed with warm acetone and hot water to obtain 43 g of a polyether ketone of the following structural units:

which had ηsp/c of 0.56 dl/g (as measured at 25° C. with respect to 0.1% by weight solution in concentrated sulfuric acid), in the form of a white powder.

The obtained polyether ketone was extruded from a spinneret having 8 orifices having a diameter of 0.3 mm at 420° C. to obtain a polyether ketone fiber having a single filament denier of 3.0. The fiber was cut to a length of 10 mm by a guillotine cutter in the same manner as described in Example 1 to obtain a TP staple fiber.

A staple fiber sheet having a basis weight of 64 g/m² was made from the polyether ketone staple fiber by the paper-making method in the same manner as described in Example 1. Then carbon filaments unidirectionally paralleled was piled on the sheet and the laminate was subjected to a high-pressure water stream treatment to obtain a composite which could be easily handled. The tensile strength in the direction orthogonal to the carbon fiber was 3,440 g/cm², and the bulk density was 0.36 g/cm³.

The composite was punched into a disc having a diameter of 96 mm, and six discs were piled in a mold having an inner diameter of 100 mm so that the directions of the carbon filaments were in agreement with one another. The heat press molding was carried out at 440° C. under 100 kg/cm² for 10 minutes. The circular molded plate taken out after the cooling solidification was a very tough molded plate wherein the polyether ketone was solidified through melting and integration.

EXAMPLE 11

A flask having an inner volume of 100 ml was charged with 43.9 g (0.201 mole) of 4,4-difluorobenzophenone, 64.9 g (0.201 mole) of 4,4-difluoroterephthalophenone, 72.5 g (0.684 mole) of sodium carbonate, 20 g of silica (Aerosil 300 supplied by Nippon Aerosil) and 40 g of diphenylsulfone. The inner atmosphere of the flask was replaced by nitrogen, and the temperature was elevated to 280° C. over a period of 30 minutes with stirring. A reaction was carried out at this temperature for 1.5 hours, the temperature was then elevated to 325° C. over a period of 30 minutes, and a reaction was further carried out for 4.5 hours. The obtained polymer was a polyether ketone having the following recurring units:

in which m is equal to n, which had ηsp/C of 0.85 dl/g (measured at 25° C. with respect to a 0.1% by weight solution).

The TP staple fiber was obtained and a composite sheet composed of the TP fiber and carbon fiber was prepared in the same manner as described in Example 10, except that the above-mentioned polyether ketone was used instead of the polyether ketone of Example 10. In the obtained sheet, the TP staple fiber did not come loose, both fibers were tightly mixed and integrated with each other, and the sheet had an excellent shapeability. The tensile strength in the direction orthogonal to the carbon fiber was 3,050 g/cm$^2$, and the bulk density was 0.34 g/cm$^3$.

EXAMPLE 12

A composite sheet having an aramid fiber content of 60% by volume was prepared in the same manner as described in Example 1 except that an aramid fiber (kevlar 49 T-965 supplied by Du Pont) having a tensile strength of 370 kg/mm$^2$, a tensile modulus of elasticity of 13 ton/mm$^2$, and a diameter of 12 μm was used instead of the carbon fiber used in Example 1. This composite sheet was pliable and did not separate into pieces when lifted up by hand. The tensile strength in the direction orthogonal to the aramid fiber was 3,110 g/cm$^2$. A plate was prepared by using this sheet, in the same manner as described in Example 6, and the flexural strength of the plate was 62.8 kg/mm$^2$, and the flexural modulus of elasticity was 7.6 ton/mm$^2$.

EXAMPLE 13

A composite sheet having a glass fiber content of 60% by volume was prepared in the same manner as described in Example 1 except that a glass fiber having a tensile strength of 300 kg/cm$^2$, a tensile modulus of elasticity of 7.4 ton/mm$^2$, and a diameter of 12 μm was used instead of the carbon fiber used in Example 1. The composite sheet was pliable and did not separate into pieces when lifted up by hand. The tensile strength in the direction orthogonal to the glass fiber was 3,410 kg/cm$^2$. A plate was prepared by using the obtained sheet in the same manner as described in Example 6, and the flexural strength of the plate was 81 kg/mm$^2$ and the flexural modulus of elasticity was 4.1 ton/mm$^2$.

EXAMPLE 14

A web was made from a staple fiber of a nylon 66 polymer having a fiber length of 32 mm according to the air-laying method, and a composite sheet having a carbon fiber content of 60% by volume was prepared by a high-pressure water stream treatment. The tensile strength in the direction orthogonal to the carbon fiber was 2,550 kg/cm$^2$, and the bulk density was 0.38 g/cm$^3$. When the flexural strength and modulus of elasticity were measured in the same manner as described in Example 6, it was found that the flexural strength was 151 kg/mm$^2$ and the modulus of elasticity was 12.8 ton/mm$^2$.

EXAMPLE 15

A sheet was prepared in the same manner as described in Example 2 except that the PPS polymer (Ryton polymer supplied by Phillips Petroleum) used in Example 10 was used instead of the nylon 66 polymer used in Example 2, the polymer was spun by blowing steam super-heated at 350° C. to spinning orifices by the melt-blow method, and the spun continuous fiber was overfed and deposited on a 200-mesh metal net.

The PPS fiber in this sheet was very fine, and when the PPS fiber was observed by a microscope, it was found that the diameter was 2 μm. Although a measurement of the degree of freedom was intended, since it was difficult to select one specific single filament from a circle having a diameter of 10 cm, a specific filament in a circle having a diameter of 1 mm was photographed under a microscope, the bent length was measured, and the degree of freedom was determined and found to be 2.5.

In the same manner as described in Example 2, a composite sheet was prepared by using this PPS fiber sheet and the carbon fiber. The tensile strength of the composite sheet in the direction orthogonal to the carbon fiber was 1,850 g/cm$^2$, and the bulk density was 0.39 g/cm$^3$. Even if the composite sheet was cut into a doughnut-like shape having an outer diameter of 11 cm and an inner diameter of 10 cm, and the cut sample was lifted by picking up the sample by the fingers, the sample did not separate into pieces, and it was confirmed that the composite sheet had an excellent operation adaptability.

EXAMPLE 16

A mix-woven yarn was prepared in the same manner as described in Comparative Example 4 except that the PEEK filament yarn was changed to a PEEK filament yarn (1740 denier/580 filaments). The mix-woven yarn was gathered in the same manner as described in Example 1 to obtain a unidirectional sheet. The degree of freedom of the PEEK fiber in the sheet was 1.05. In the same manner as described in Example 1, the PEEK fiber was cut into a staple fiber having a length of 10 mm and a thin slurry was formed by using this staple fiber. By using this slurry, a sheet having a basis weight of 0.4 g/m$^2$ was made on the above-mentioned sheet. In the same manner as described in Example 1, the laminate was subjected to a high-pressure water stream treatment, the formed sheet was turned over, and a sheet having a basis weight of 0.4 g/m$^2$ was similarly formed on the sheet (the sum of the amounts of the sheets formed on the front and back side was 0.2% by volume based on the entire composite sheet). Then the high-pressure water stream treatment was carried out.

The obtained composite sheet had a very good pliability, and the sheet did not separate into pieces when lifted up by hand. The tensile strength in the direction orthogonal to the reinforcing fiber was 21 g/cm$^2$, and the bulk density was 0.45 g/cm$^3$.

EXAMPLE 17

A multifilament yarn having a single filament denier of 5 was prepared in the same manner as described in Example 9 except that a polyether imide (Ultem 1000 supplied by General Electric) was used instead of the thermoplastic polymer used in Example 9. A sheet was prepared in the same manner as described in Example 16 except that the basis weight of the formed sheet was changed to 1.2 g/mm$^2$ and the same carbon fiber as used in Example 1 was used as the yarn to be mixed.

By using the polyether imide as described above, a polyether imide emulsion was prepared according to Example 1 of Japanese Unexamined Patent Publication No. 1-092271. The emulsion was poured into the above-mentioned sheet to effect impregnation, and the impregnated sheet was dried at room temperature to obtain a composite sheet having a carbon fiber content of 60% by volume, a polyether imide fiber content of 1% by volume and an emulsion solid content of 39% by volume. In this sheet, the emulsion particles were substantially uniformly dispersed in the reinforcing fiber. The composite sheet was somewhat harder than the composite sheets of other examples, but the composite fiber had a pliability such that even if the composite sheet was wound on a column having a diameter of 1 cm, the reinforcing fiber was not broken, and even if the composite sheet was lifted up by hand, the composite sheet did not separate into pieces. The tensile strength in the direction orthogonal to the reinforcing fiber was 74 $g/cm^2$, and the bulk density was 0.51 $g/cm^3$.

For comparison, a sheet was prepared in the same manner as described above except that the formed sheet was not used. When the obtained sheet was slightly bent in the direction parallel to the reinforcing fiber, cracking readily occurred. Accordingly, the tensile strength in the direction orthogonal to the reinforcing fiber was prepared by preparing a tape so that the deformation did not occur, and it was found that the tensile strength was 4 $g/cm^2$.

A plate was prepared by using the obtained composite sheet in the same manner as described in Example 7. A voidless plate having a flexural strength of 171 $kg/mm^2$ and a flexural elastic modulus of 11.1 $ton/mm^2$ was obtained.

INDUSTRIAL APPLICABILITY

The composite sheet has an excellent operation adaptability at the step of processing into a molded article, compared with conventional sheets of the same kind, and the composite sheet of the provides a molded article having a higher strength under the same molding conditions. Namely, a high-strength plate can be obtained under a wide range of molding conditions and a molded article having a high strength can be obtained from this plate. This molded article can be widely used in various fields. As typical instances of the use thereof as the composite, there can be mentioned driving members and parts of an airplane or artificial satellite, boats, and surf boards.

We claim:

1. A composite sheet for a fibrous reinforcing material, which comprises a web comprising reinforcing continuous fibers having an elastic modulus of 5,000 $kg/mm^2$ or more, and a tensile strength of 100 $kg/mm^2$ or more, and thermoplastic polymer fibers in a single filamentary form, wherein the amount of the reinforcing continuous fibers is 5 to 80% by volume based on the composite sheet, and the thermoplastic polymer fibers in the single filamentary form are involved in the web-constituting continuous filaments in an entangled and integrated state.

2. A composite sheet according to claim 1, wherein the web in a web in which the reinforcing continuous fibers are gathered and paralleled undirectionally.

3. A composite sheet according to claim 1 wherein the web is a woven fabric of the reinforcing filament bundle.

4. A composite sheet as set forth in any of claims 1 through 3, wherein the thermoplastic polymer fiber is a staple fiber.

5. A composite sheet according to any of claims 1 through 3, wherein the thermoplastic polymer fiber is a filament having a degree of freedom of at least 1.2.

* * * * *

UNITED STATES PATENT AND TRADEMARK OFFICE
CERTIFICATE OF CORRECTION

PATENT NO.    : 5,286,553
DATED         : February 15, 1994
INVENTOR(S)   : Keiichi Haraguchi It is certified that error appears in the above-indentified patent and that said Letters Patent is hereby corrected as shown below:

Claim 2, col. 22, line 23, "in" (first occurrence) should read --is--.

Signed and Sealed this

Fifth Day of July, 1994

Attest:

BRUCE LEHMAN

Attesting Officer                Commissioner of Patents and Trademarks